Figure 1:
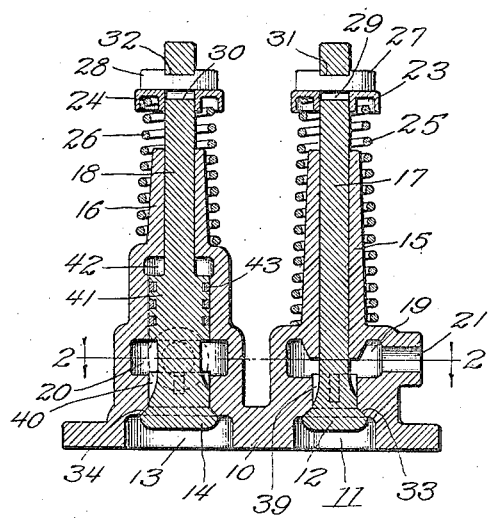

L. A. LANG.
VALVE CONSTRUCTION.
APPLICATION FILED AUG. 31, 1916.

1,302,385.

Patented Apr. 29, 1919.

Witnesses:
Robert F. Weir
Arthur W. Carlson

Inventor
Lincoln A. Lang.
By Offield Towle Graves & Offield
Attys

UNITED STATES PATENT OFFICE.

LINCOLN A. LANG, OF CHICAGO, ILLINOIS, ASSIGNOR TO THE NORTHERN TRUST COMPANY, TRUSTEE, OF CHICAGO, ILLINOIS, A CORPORATION OF ILLINOIS.

VALVE CONSTRUCTION.

1,302,385.   Specification of Letters Patent.   Patented Apr. 29, 1919.

Application filed August 31, 1916.  Serial No. 117,832.

*To all whom it may concern:*

Be it known that I, LINCOLN A. LANG, a citizen of the United States, residing at Chicago, in the county of Cook and State of Illinois, have invented certain new and useful Improvements in Valve Constructions, of which the following is a specification.

My invention relates to improvements in valve constructions, and is particularly suitable for use in connection with puppet valves. Although the invention is capable of many uses, it will be found to be of special value when applied to controlling mechanisms employing fluid pressure cylinders, for instance, air-controlled cylinders in servo motor follow-up mechanisms, such as are employed for steering ships or for reversing the valve gearing of steam locomotives. Where fluid pressure cylinders are utilized in controlling mechanisms such as I have described, the position of the piston in the cylinder determines the controlling effect of the apparatus, and it is important that such position should be maintained constant or practically constant, without being subject to surges creeping or fluttering effects; and it is also important that the valves controlling said cylinders should respond quickly to changed conditions, while at the same time being as gas-tight as possible so as to conserve the supply of motive fluid.

The objects of my invention are, to provide in a puppet valve arrangement means whereby the area of the valve opening is restricted at the commencement of a valve-opening movement and is gradually increased to the full area, or substantially so, as the valve approaches its limit of movement; to provide a puppet valve arrangement in which the pressure of the supply of motive fluid tends to close the valve, thereby assisting the spring or other means by which said valve is ordinarily closed and preventing the pressure of the fluid from tending to open said valve; to provide in a valve of the type last described means whereby leakage of fluid is substantially prevented without imposing an excessive amount of frictional drag or stiffness on the movement of the valve; to provide a construction which shall be simple in design and economical to manufacture; and, in general, to provide a neat, practical, and efficient construction of the character referred to.

In the drawings accompanying this application—

Figure 2:
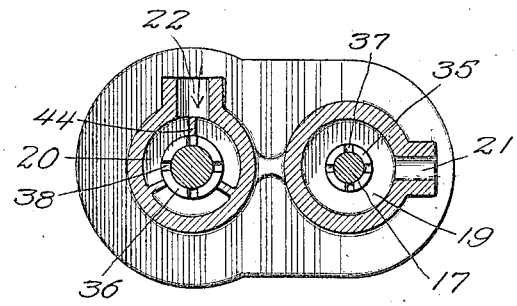

Figure 1 represents an axial section taken through a pair of puppet valves embodying my invention and constituting parts of a valve control for the air-cylinder of a servo motor follow-up mechanism; and Fig. 2 is a section taken on the line 2—2 of Fig. 1.

In the drawings, 10 represents a casting or housing which is adapted to be bolted or secured in any suitable manner, to the side of the air-control cylinder (not shown) the latter being provided with a suitable duct or passage leading from one end of the cylinder and registering with the opening 11 in said casting directly beneath the exhaust valve 12. In the side of said cylinder is also constructed an air chest connected to a supply of air under pressure, said chest having an opening registering with the pocket 13 directly beneath the inlet valve 14. Directly above the valves 12 and 14 there are formed a pair of integral upward extensions 15 and 16 of the casting 10 bored out to form guides in which the stems 17 and 18 of said valves slide freely.

Above the heads of the valves 11 and 14 the extensions 15 and 16 of the casting 10 are enlarged and chambered out, as shown at 19 and 20, the chamber 19 having an opening thereto 21 for the exhaust, while the chamber 20 communicates with a conduit 22 connected to the interior of the cylinder by means of a suitable pipe. Surrounding the upper ends of the stems 17 and 18 of the valves are a pair of recessed collars 23 and 24 for receiving the ends of a pair of coil compression springs 25 and 26 for effecting the closure of the valves, the ends of said springs engaging abutments formed by shoulders on the extensions 15 and 16 of the housing. The collars 23 and 24 are prevented from flying off the ends of the stems 17 and 18 by means of a pair of flat keys 27 and 28 which pass through transverse slots 29 and 30 in the ends of the valve stems, said keys being notched out at their upper edges, as shown at 31 and 32, so as to interlock with the upper ends of the valve stems.

The mushroom heads of the exhaust valve 12 and the inlet valve 14 are both of usual construction, having annular areas inclined at an angle to engage the oblique valve seats 33 and 34. However, in order to prevent a too sudden opening of the valve when the stems are depressed, the stem of each valve immediately above the head is enlarged and made cylindrical, as shown at 35 and 36, in order to fit within corresponding openings bored in the valve housing above the valve seats 33 and 34. The said cylindrical portions are a free sliding fit within said cylindrical openings so as not to interfere with the proper closing of the valve under the influence of the springs 25 and 26. In order to provide openings for the motive fluid when the valves are actuated, I mill in the outer surfaces of said cylindrical portions 35 and 36 a series of grooves or notches, as at 37 and 38, said grooves having a maximum depth at the top of the cylinder and decreasing in depth toward the bottom of the cylindrical portions of the valves. It will be observed by reference to Fig. 1 that the different grooves cut in each cylindrical valve portion extend different distances in a direction toward the heads of the valves, the grooves 39 and 40 being those which are cut lowest and extend almost to the oblique seating areas of the valves.

It will be readily understood that when one of the valves is depressed so as to open the same and cause motive fluid to flow in or out of the cylinder, the initial opening movement of the valve will first cause the point of the lowest groove to be placed in communication with the pockets under the valve, and, subsequently, if the movement of the valve be continued, the other grooves will be successively exposed and serve to increase the effective opening of the valve. When the valve is completely depressed, the full effective area of the valve will be utilized, it being of course apparent that the grooves are made of the required number and size to furnish the maximum flow of fluid desired. This gradual opening of the valves is of particular importance in the case of servo motor follow-up mechanisms where the controlling piston with its associated valve mechanism is subjected to disturbing influences, frequently causing a fluttering or surging of the piston in the cylinder with the ordinary exising types of valves. Such tendencies are absolutely overcome by means of my improved valves having their openings restricted at the commencement of their travel.

In controlling mechanisms such as I have described, conditions are frequently such that the piston is maintained in equilibrium by means of air or other fluid under pressure contained in one or both ends of the cylinder. The chamber 20, which is connected to one end of the cylinder by means of the conduit 22, will therefore contain pressure fluid, said fluid tending to escape through the joint or gland around the stem of the valve 14. In mechanisms of this character it is important to reduce this leakage to a minimum, on account of the fact that a loss in pressure in one end of the cylinder will destroy the equilibrium of the various parts, necessitating movements of the valve mechanism to compensate for such loss of pressure. In many cases the loss of fluid by such leakage is also a serious disadvantage, requiring the installation of a more powerful pump or other apparatus than would be otherwise required in the absence of such leakage. My improved construction is designed to overcome such leakage and consequent loss of pressure in the cylinder.

Referring to Fig. 1, it will be seen that an intermediate portion 41 of the stem 18 of the inlet valve is enlarged and made cylindrical in shape in order to slide within a cylindrical opening bored out in the valve housing immediately above the annular chamber 20. The upper part of said cylindrical bore is enlarged, as shown at 42, in order to minimize the sucking or cushioning effect due to the plug or piston 41 sliding in the housing. Leakage of fluid between the plug 41 and the wall of the housing is minimized by equipping said plug or piston 41 with a series of expansible or compressible rings 43 which constitute miniature piston rings of conventional type which cooperate with the plug and the housing in a well known manner. It will be observed that the diameter of the piston part 41 is such that it can be inserted or withdrawn from the housing through the cylindrical passage leading from the chamber 20 to the opening 13 below the head of the valve, thereby rendering it possible to remove the puppet valve from its housing, for any purpose, in the customary manner after the key 28 has been removed.

The rings 43 normally tend to expand and press against the wall of the cylindrical bore in which they slide; therefore, it becomes necessary to provide some arrangement whereby when inserting the valve in its housing the rings are prevented from expanding while the valve is being inserted in the housing; otherwise, the improper expansion of the piston rings would result in their engaging the edge of the cylindrical bore in the housing, thus making it impossible to insert the valve. This difficulty I overcome by forming the casting or housing of the valve with a series of inwardly projecting arms 44 constructed as integral parts of the housing and bored out on their inner ends concentric with and the same diameter as the cylindrical bore in which slides the piston 41. It will be readily understood that said arms 44 will prevent the rings from springing outwardly and causing an obstruction when the valve is thrust into its housing.

The valve packing, such as I have described, is extremely effective in preventing leakage from the chamber through the crevice between the stem and the housing in which it slides, and friction which might interfere with the proper sliding movement of the valve under the influence of its spring is reduced to the smallest amount possible, the fit between the stem and its housing being only such as is required to cause the valve stem to be properly guided in its axial movement. The arrangement such as I have described is in sharp contrast with the ordinary gland packing which, in order to prevent leakage, must be screwed up tightly around the stem of the moving part, thus imposing a heavy frictional drag upon the movement of the valve in its housing and requiring the use of a very strong spring to overcome the frictional resistance.

A gland packing of the ordinary type for a puppet valve stem is impractical for this reason, the objections to its use being greatly aggravated when the apparatus must be handled by unskilled persons who may place the valve out of commission by unduly tightening up the gland in the effort to prevent leakage.

It will be manifest that the invention may be embodied in other forms and applied to different uses without sacrificing efficiency or the benefits derived therefrom. The scope of the invention must, therefore, be determined by reference to the appended claim, the described details of construction being merely illustrative and not essential elements of the invention.

I claim—

In a puppet valve construction, the combination of a housing provided with a cavity for receiving pressure fluid, said housing having an annular valve seat at one end of said cavity and a cylindrical bore at the other end of said cavity, a puppet valve coöperating with said seat for sealing said cavity and having a stem extending through said cavity and bore and out of the housing, said stem being concentric with and enlarged to fit said bore, and an expansible metallic packing ring carried by said enlargement for preventing fluid from passing between said enlargement and the wall of said bore, the diameter of said bore being less than the diameter of said cavity and opening directly into said cavity whereby the enlargement may be inserted into said bore from said cavity, said housing being provided with guiding means in said cavity for limiting the expansion of said ring while in said cavity during the insertion of said enlargement.

LINCOLN A. LANG.

Copies of this patent may be obtained for five cents each, by addressing the "Commissioner of Patents, Washington, D. C."